Figure 1:
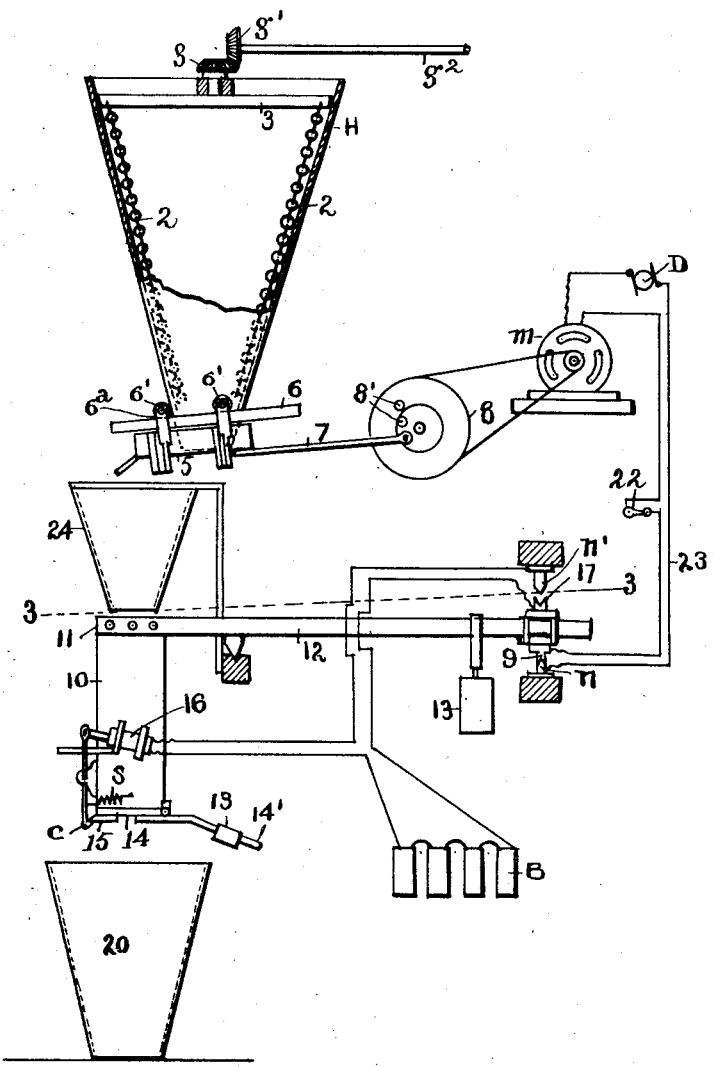

C. C. VOGLESONG.
AUTOMATIC WEIGHING APPARATUS.
APPLICATION FILED SEPT. 23, 1912.

1,083,959.

Patented Jan. 13, 1914.
2 SHEETS—SHEET 1.

ATTEST
INVENTOR
Charles C. Voglesong
BY Fisher & ——— ATTYS.

C. C. VOGLESONG.
AUTOMATIC WEIGHING APPARATUS.
APPLICATION FILED SEPT. 23, 1912.
1,083,959.
Patented Jan. 13, 1914.
2 SHEETS—SHEET 2.
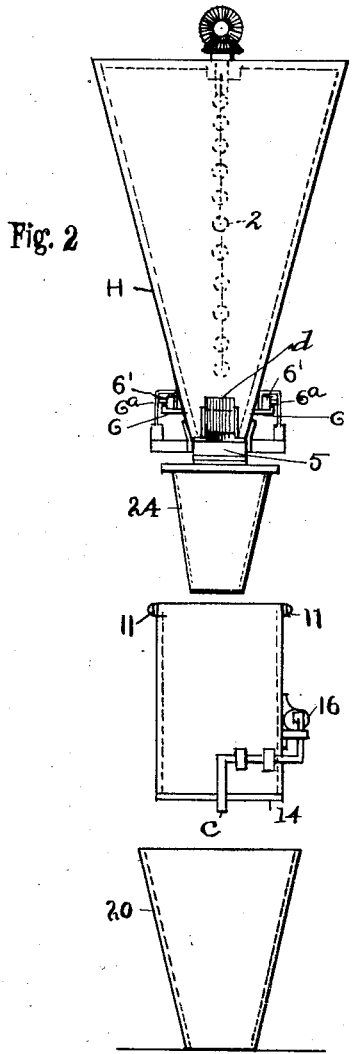
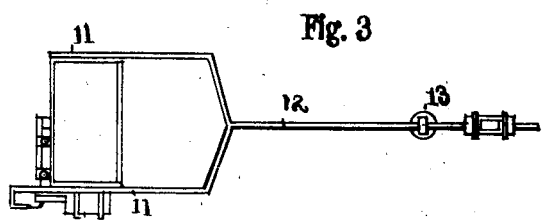

UNITED STATES PATENT OFFICE.

CHARLES C. VOGLESONG, OF OAKLAND, CALIFORNIA.

AUTOMATIC WEIGHING APPARATUS.

1,083,959. Specification of Letters Patent. Patented Jan. 13, 1914.

Application filed September 23, 1912. Serial No. 721,737.

*To all whom it may concern:*

Be it known that I, CHARLES C. VOGLESONG, citizen of the United States, residing at Oakland, in the county of Alameda and State of California, have invented certain new and useful Improvements in Automatic Weighing Apparatus, of which the following is a specification.

This invention relates to a weighing apparatus adapted especially to weigh mixed materials in a dry state intended for use in the manufacture of what has become known as plaster board.

In the accompanying drawings, Figure 1 is a side elevation of the apparatus partially in section. Fig. 2 is a side elevation of the particular parts through which the material passes to a container for the weighed material. Fig. 3 is a plan view of the weighing beam and receptacle.

In handling the materials for the manufacture of plaster board by my process or method it is important that the materials be first thoroughly mixed in a dry state and then accurately measured or weighed as the work progresses to make blocks of a uniform size and density, and I have found that weighing of the material for each block is essential and that such weighing should be automatic and adapted to repeat as the work progresses. To these ends I provide certain needed mechanism comprising a receiving hopper H of a downwardly tapered pattern into which the material is fed or supplied from any available source and wherein it is intended to be stirred or agitated to keep it alive and promote admixture. In the present construction I provide a horizontally rotatable bar 3 supported at its middle in the top of the said hopper and provided with a short shaft carrying a bevel gear $g$ meshing with a driving gear $g'$ on a shaft $g^2$, and chains 2 hang from the ends of said bar and keep the material sufficiently under motion about the side of the said hopper to avoid stagnation and to facilitate its flow to or into the feeding device 5 at the bottom of the hopper. The said device 5 is a reciprocating trough shaped part arranged at a slight inclination to its discharge end and provided with suitably supported rollers or wheels 6′ at its top running on side tracks 6 rigid with the bottom and sides of the hopper, arms 6ª or their equivalent serving to support said wheels from the sides of the feed device 5. A slide door $d$ governs the flow of the dry material into the said feeding device and regulates the flow from the said hopper. Power is applied to the said device to reciprocate the same by means of a band wheel 8 and an eccentric connecting rod 7 engaged with said wheel in any one of the several holes 8′ according to the throw of said device that may be wanted, and said wheel is actuated from electric motor $m$ at intervals as hereinafter described.

The weighing receptacle 10 is a suitable box shaped part carried at its top by the balancing bar or beam 12 which has side arms 11 engaging said receptacle and a drop bottom 14 is hinged on the bottom edge of said receptacle and has a suitable counterweight 13 and arm 14′ which is sufficient in any event to automatically close said bottom when there is no pressure from inside and the said weight may be adjusted to meet conditions as usual. A catch $c$ pivoted on the side of the receptacle engages a lip or projection 15 on the bottom 14 and holds the bottom in closed position under a load. The said catch has a spring $s$ to keep it engaged and a magnet 16 is in operative relations with the upper end of said catch and adapted to swing the same on its pivot and open the catch and drop the bottom 14 the instant the load in receptacle 10 reaches a certain predetermined weight overcoming the weight 13.

On the electrical side of the apparatus I employ a battery B for the various electrical connections having to do with the weighing mechanism, and a source of energy, as a dynamo D, having working relations with the motor $m$ and adapted to be thrown into and out of circuit by the weighing beam 12. The several wires or lines shown indicate the current connections, and battery energy flows to the said motor or source of driving energy therefor to run the motor when contact of beam 12 occurs at point 9 and the weighing receptacle 10 has been discharged and is to be refilled, whereas contact occurs at point 17 above when the receptacle has been filled and is to be discharged. Then the magnet 16 is energized and the catch $c$ is released to dump the load into the receiver or container 20 beneath. The time of discharge from receptacle 10 to 20 is instant the moment that bottom 14 is opened, but in this instant or interval the operation of the motor and its working connections is suspended and is resumed automatically after the discharge of receptacle 10 and the restoration of the parts for refilling, the beam 12 dropping down into contact 9 as this occurs. Thus the entire operation of the apparatus is made automatic and requires no personal care or attention. A switch 22 is provided in the motor or dynamo circuit 23.

A suitable guide chute 24 of funnel shape is shown into which the material is delivered from device 5 and thence into receptacle 10. The said chute has no bottom and is in fixed relation as respects the said receptacle but small enough at the bottom to always direct the material thereinto. Otherwise any suitable means of delivery of the material from the shaker 5 to the receptacle 10 may be adopted. Practically the electrical circuit 23 is between point 9 and the motor $m$ and is so treated herein. Specifically, the two contacts 9 and 17 on the beam 12 are insulated from each other and close the circuits by engaging either of the fixed contacts $n$ and $n'$ on the frame work which supports them. The pivot of beam 12 is at 25.

Usually the apparatus has an automatic register attached thereto, but not shown herein which registers the dumps made by the machine in any given time.

In operation the weight 13 is moved on the bar 12 to such position as will exactly measure and fix the weight of the charge in receptacle 10, and in that case will close the circuit at 9 on the motor. The parts will remain in this position until the weight 13 is overcome by the charge in the receptacle and the bar 12 is tilted into contact at 17. This change throws the energy of battery B into the magnet 16 and works the opening of the bottom 14 and the release of the charge.

What I claim is:

1. In an automatic weighing apparatus, a feed hopper and a reciprocating feeding device at the bottom thereof, an electric motor and means engaged therewith to reciprocate said feeding device, in combination with a weighing receptacle relatively beneath said hopper having a counterweighted and electrically released bottom, a weighing beam pivotally supporting said receptacle and opposite electrical contacts at its free ends and an electric circuit between said contacts and the said motor and the said receptacle bottom respectively and adapted to stop and start the said motor alternately with the action of said receptacle.

2. A machine having a hopper to receive the material and an agitator therein, a weighing receptacle adapted to be balanced within limits, a reciprocating feeding device at the bottom of said hopper and a stationary chute for the material between said device and the top of said receptacle, in combination with an electrical motor in actuating relations with said feeding device and electrical means controlled by said receptacle adapted to automatically stop and start said motor.

In testimony whereof I affix my signature in presence of two witnesses.

CHARLES C. VOGLESONG.

Witnesses:
C. F. COBURN,
W. R. DREXEL.